INVENTOR
JULIEN J. B. LAIR
BY [signature]
ATTORNEY

Jan. 5, 1960 J. J. B. LAIR 2,920,288

PULSE MODULATION SYSTEMS

Filed Jan. 7, 1955 3 Sheets-Sheet 2

INVENTOR
JULIEN J. B. LAIR
BY Percy P. Lantzy
ATTORNEY

INVENTOR
JULIEN J. B. LAIR
BY [signature]
ATTORNEY

United States Patent Office 2,920,288

Patented Jan. 5, 1960

2,920,288

PULSE MODULATION SYSTEMS

Julien J. B. Lair, Glen Ridge, N.J., assignor to International Telephone and Telegraph Corporation, Nutley, N.J., a corporation of Maryland Application January 7, 1955, Serial No. 480,341

14 Claims. (Cl. 332—9)

This invention relates to pulse modulation systems and more particularly to pulse amplitude modulation (PAM) modulator systems.

Heretofore, PAM modulator systems have employed balanced transformer arrangements or delay lines terminated in a variable resistance as controlled by an active modulating network. In the former arrangement, the adjustments are critical and the circuit components are expensive. In the latter arrangement, care is required to properly select the tap point along the delay line to insure that the incident and reflected waves thereon have aided each other to produce a PAM output whose amplitude is a linear function of the variable resistors. Furthermore, the active modulator network including at least triode type electron discharge devices must be selected to provide a linear resistance variation therein in response to the modulating signal energy.

Therefore, an object of this invention is to provide an improved PAM modulator system employing passive networks for amplitude modulating a pulse signal.

Another object of this invention is to provide a PAM modulator system including a time delay device excited by a pulse source and a passive network terminating said delay device. The resistance of said passive network is varied in accordance with the magnitude of an intelligence source to produce a reflected amplitude modulated pulse which may have an amplitude disposed between a given negative maximum amplitude and a given positive maximum amplitude depending upon the effective resistance of said passive network in relation to the characteristic impedance of the time delay device.

A feature of this invention is the provision of a variable resistance network for terminating a delay means whose resistive value is varied in accordance with a source of modulating energy to modulate the termination of the delay means in a manner to produce a reflected pulse whose amplitude and polarity is a function of the modulated termination.

Other features of this invention include unidirection devices, and light sensitive devices for utilization in the variable resistance network terminating the delay means.

Still other features of this invention include particular circuit arrangements at the exciting end of the delay means to utilize the circuits of this invention in a radio communication system or a telemetering system.

The above-mentioned and other features and objects of this invention will become more apparent by reference to the following description taken in conjunction with the accompanying drawings, in which.

Figure 1:
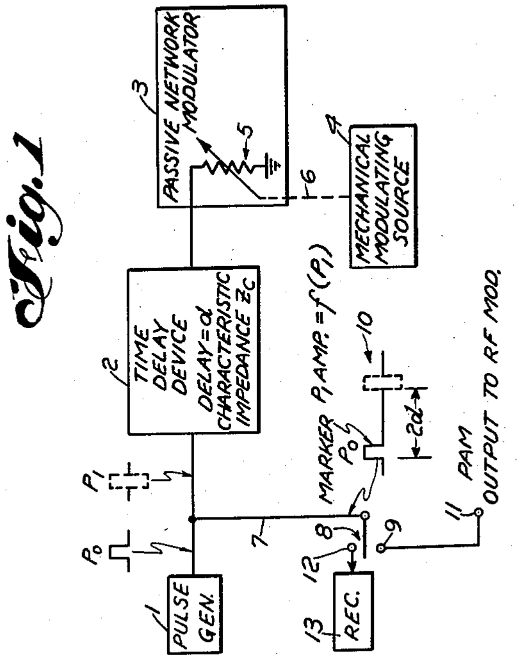
Fig. 1 is a schematic diagram in block form of an embodiment of this invention.

Referring to Fig. 1, the pulse amplitude modulation system of this invention is illustrated as including a pulse generator 1, a time delay device 2 coupled to the output of generator 1 and a passive network modulator 3 terminating delay device 2. Network 3 includes a means hereinafter described having a variable resistance characteristic whose value is controlled by the magnitude of energy from a signal energy or modulating source 4. The variation of resistance in network 3 by the energy of source 4 provides a variable termination for delay device 2. Thus, the pulse $P_0$ coupled from the output of generator 1 to the input of delay device 2 is reflected from the termination end thereof to the input end producing a pulse output whose amplitude and polarity is dependent upon the relative resistive relationship between the characteristic impedance of delay device 2 and the variable resistance of network 3. The time delay, *d*, of the delay device 2 should be at least equal to half of the width of the output pulse of generator 1 so that the reflected pulse $P_1$ will not interfere with pulse $P_0$. The repetition rate of pulse generator 1 should further be adjusted to be equal to or greater than a value proportional to two times the width of the pulse output of generator 1 to assure non-interference between the pulses of generator 1, exciting device 2 and the reflected pulses.

Passive network modulator 3 is employed to terminate delay device 2 in a manner to reflect the generated pulses applied to the input thereof to provide a PAM output whose amplitude value is a function of the intelligence or energy of the modulating source. This relationship between the modulating source energy and the amplitude of the reflected pulse is accomplished by passive network 3 which may include any type of resistor whose value is a function of the energy to be transmitted. For instance, as indicated in Fig. 1, the passive network modulator 3 may be a potentiometer 5 whose resistive value is varied, a servo-mechanism or any other mechanical device in coupled relation with the movable arm thereof, by mechanical linkage 6 coupled between modulating source 4 and resistor 5. The resistive element of network 3 may also be a thermo-sensitive resistor (thermistor), a current-sensitive resistor (diode), a light-sensitive resistor (photocell), or a sound vibration-sensitive resistor (microphone).

When the resistive value of the network 3 terminating delay device 2 is equal to the characteristic impedance of the delay device, there is no reflection from the output end of the delay device. However, if the terminating resistance of delay device 2, as provided by network 3, is varied higher or lower than the characteristic impedance of delay device 2 by modulating source 4, the pulse traveling on delay device 2 is reflected from the terminated end thereof back along the delay device 2 to the input end having a positive or negative polarity with an amplitude which is the function of the ratio $$\frac{R-Z_C}{R+Z_C}$$

where R is equal to the resistive value of the terminating network and $Z_C$ is equal to the characteristic impedance of the delay device. The possible positive and negative amplitudes which the reflected pulse may achieve between a maximum negative range and a maximum positive range is indicated by the dotted pulse wave form designated $P_1$ in Fig. 1 of the drawing.

It should be noted that the passive network modulator 3 employed in conjunction with the system of this invention does not employ any source of voltage, current, or power to amplitude modulate a pulse signal but relies strictly upon the variation of resistance of an element included therein as dictated by the energy of a modulating source whether this energy is in the form of mechanical, heat, light, sound vibration or electrical energy. It should be further noted that time delay device 2 may be any desired delay line purposely fabricated to function to delay signals applied thereto or may include the transmission medium, transmission line or wireless transmission path, when the network 3 is located at a distance from the pulse generator 1. This latter situation would primarily apply to a telemetering system where it may be desired to monitor a remote indicating device by the system of this invention. In this latter arrangement, the delay of the delay device would then be equal to the physical distance between the pulse generator 1 and the network 3 divided by the speed of propagation of the pulse between these two components. If the physical distance between pulse generator 1 and network 3 should be such that the time delay exhibited by delay device 2 is less than one-half the width of the generated pulse of generator 1, then a small delay line having sufficient time delay could be added to the transmission medium delay to provide a total time delay greater than one-half the width of the output pulse of generator 1.

As disclosed in Fig. 1, an output connection 7 is provided at the input of delay device 2. Output connection 7 provides a parallel path for the output pulse of generator 1 and thus the pulse injected to the input of delay device 2 is also coupled to output connection 7. When the reflected wave $P_1$ returns at the input of delay device 2, this pulse with its associated amplitude modulation is likewise coupled to output connection 7. Thus, the resultant output pulse signal is the output pulse of generator 1 and the reflected amplitude modulated pulse. Further reflection from the input end of time delay device 2 is prevented by purposely terminating the input end of delay device 2 in a resistance equal to the characteristic impedance of device 2, said terminating resistance being provided by the effective output resistance of generator 1.

If time delay device 2 is a delay line, and the circuit arrangement of this system is to be employed to generate a PAM signal, for modulating a radio frequency modulator to accomplish radio communication, switch 8 would be placed in position to connect output connection 7 to contact 9 such that the pulse waveform 10 would be coupled to the radio frequency modulator by terminal 11. As illustrated in waveform 10, the pulse $P_0$ would function as the marker pulse of the PAM pulse train while $P_1$ would function as a channel pulse to convey the intelligence of modulating source 4 by the amplitude variation thereof, a function of the resistance of the passive network modulator 3, to a distant radio communication receiver. It is further proposed that the modulating system of Fig. 1 can be utilized as a telemetering system. For example, the modulating source 4 may be some indicating device located remotely from pulse generator 1 and includes means to vary the terminating resistance of network 3 such that the resistance thereof is a function of the position of the indicating device envisioned as modulating source 4. In this instance, time delay device 2 will include as a portion thereof the transmission medium between the control point and the remote indicating device. The reflected pulse coupled to output connection 7 would then be coupled via switch 8 through contact 12 to receiver 13 which would demodulate the reflected pulse to recover the amplitude thereof in a manner to provide a local indication of the remotely monitored indicating device of source 4.

Figure 2:
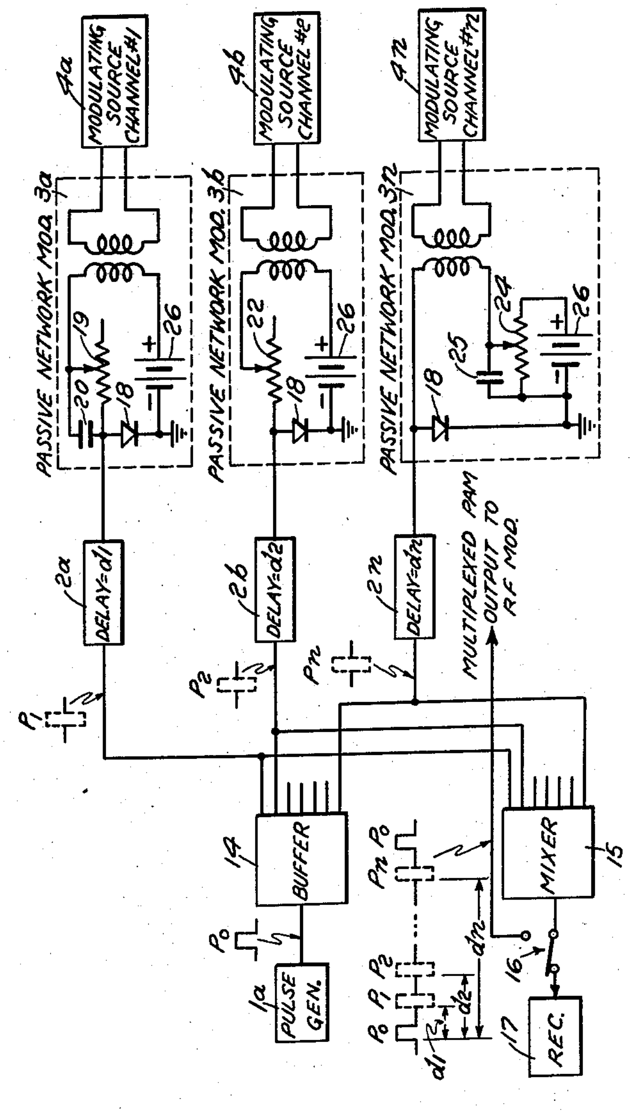
Fig. 2 is a schematic diagram in block form of another embodiment of this invention.

Referring to Fig. 2, a multiplex version of the circuit of Fig. 1 is illustrated. In the multiplex arrangement of Fig. 2, the pulse generator 1*a* applies an output pulse $P_0$ through a buffer amplifier 14 to a plurality of delay lines 2*a*, 2*b* and 2*n*, similar in nature to delay device 2 of Fig. 1. Each of the delay devices would have a different delay time to provide a time interleaving of the reflected pulses. Each of these delay devices is terminated in its own passive network modulator 3*a*, 3*b*, and 3*n*, respectively, to provide a variable termination for the delay device in response to a modulating source associated therewith and indicated in the drawing at 4*a*, 4*b* and 4*n*. The individual reflected pulses of the channels are coupled to mixer 15 wherein they are multiplexed on a time basis, established by the different time delays present in delay devices 2*a*, 2*b* and 2*n*, with the output of generator 1*a* to form the resultant pulse signal. As in Fig. 1, the output of the mixer may be applied via switch 16 to a radio frequency modulator for radio communication or to a receiver 17 for telemetering indications of a plurality of remotely located indicating devices. As in Fig. 1, the delay device may be either a physical delay line or the transmission medium disposed between the pulse generator and the plurality of indicating devices. If necessary, a small physical delay line may be added to the transmission medium to assure that the reflected pulse does not interfere with the pulse activating the delay lines 2*a*, 2*b* and 2*n*. Furthermore, the repetition rate of the output of pulse generator 1*a* must be such as not to interfere with any one of the plurality of reflected pulses.

The phase network modulators illustrated schematically in Fig. 2 employ three different circuit arrangements to terminate their associated delay devices in a resistance which is variable in accordance with the modulating source. Each of the illustrated modulator networks include as the variable resistive component diode 18. The difference between these modulator networks resides in the biasing arrangement for the diode 18. The arrangement for network modulator 3*a* includes a resistor 19 and a capacitor 20 so combined that the resistive value of resistance 19 does not reduce the amplitude of the audio signal impressed upon diode 18 by means of transformer 21. The arrangement of network 3*b* merely includes a variable resistance 22 which will, to a certain extent, reduce the amplitude of the audio signal impressed across diode 18 from transformer 23, but in certain instances, this loss of amplitude is unimportant. The arrangement of network 3*n* includes a voltage divider resistance 24 and a by-pass condenser 25. In each instance, the variable resistor is adjusted so that the D.C. voltage from the bias battery 26 sets the conduction resistance of the diode 18 to be equal to the characteristic impedance of the delay device. By this arrangement, the reflected voltage may have either a positive or a negative polarity, depending upon the swing of the energy of the modulating source, and thus, more or less conduction, more or less conduction resistance is present in diode 18. The diode 18 may be a copper oxide, germanium, or silicon semiconductive diode, a vacuum diode, or a gas tube.

Figure 3:
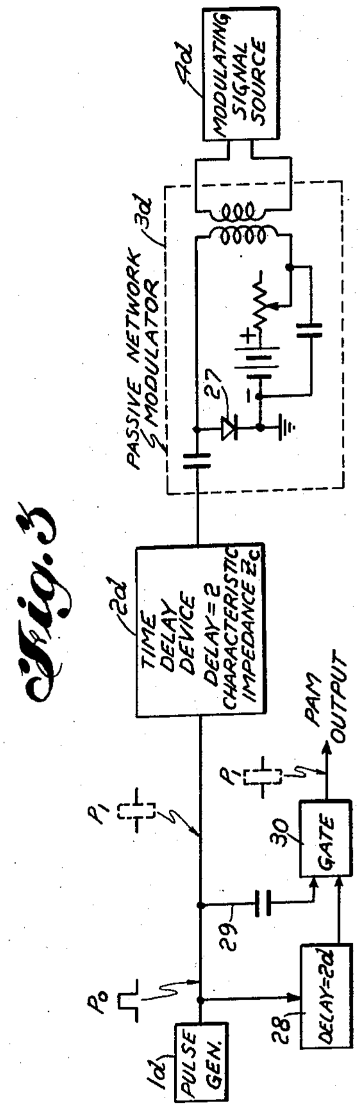
Figs. 3, 4 and 5 are schematic diagrams in block form of still other embodiments of this invention.

The embodiment disclosed in Fig. 3 is similar in nature to the embodiments disclosed in Figs. 1 and 2 and functions in substantially the same manner. The modulator network 3*d* illustrates still a further embodiment of the current-sensitive type variable resistive element to terminate device 2*d* in a variable resistance in accordance with the energy of modulating source 4*d*. The difference between modulator 3*d* and the modulator circuits of Fig. 2 resides in the bias arrangement for the diode 27. Each one of these bias arrangements has in common the purpose of biasing the diodes to impart thereto a conduction resistance equal to the characteristic resistance of the delay device to enable the production of a reflected pulse having a positive or negative polarity. The output of pulse generator 1*d* is coupled to delay device 2*d* and to a second delay device 28 having a delay time equal to twice the delay time of device 2*d*. When the reflected pulse $P_1$ arrives at the input of delay device 2*d*, with the polarity and amplitude dictated by the resistive value of the terminating circuit, it is coupled via conductor 29 to a coincident gate circuit 30. Since the time of travel of the pulse on delay device 2*d* is equal to twice the time delay thereof, the output of device 28 will coincide with the arrival of the reflected pulse at gate 30 in a manner to turn on gate 30 in a coincident manner to allow passage of the reflected pulse, the resultant pulse signal, therethrough for utilization either to modulate a radio frequency generator for radio communication or for application to a telemetering receiving system.

Figure 4:
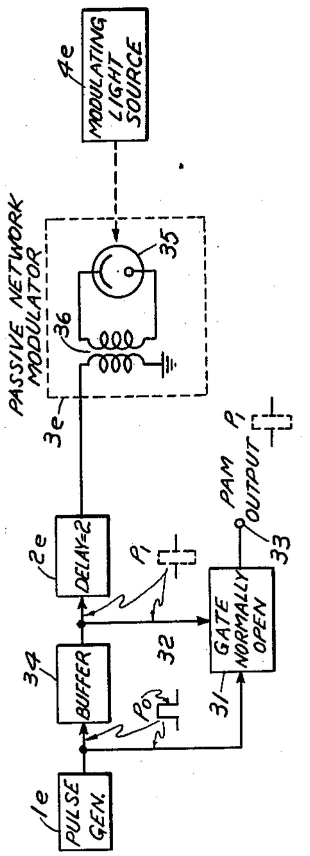

Reference to Fig. 4 illustrates an arrangement similar to that of Fig. 3 wherein the output of pulse generator 1e is employed to enable the passage of the reflected pulse only as the resultant pulse signal to a ulitization means. However, this circuit arrangement of Fig. 4 does not require the incorporation of the delay line 28 of Fig. 3. The output of pulse generator 1e is coupled to a normally open gate 31 which acts to close a connecting path between conductor 32 coupled to the output of delay device 2e and the PAM output terminal 33. The gate 31 will remain closed until such time as the reflected pulse is coupled to terminal 33 and then will resume its normally opened condition until energized again by the output of generator 1e. The buffer amplifier 34 disposed between the output of generator 1e and the input of delay device 2e is employed to prevent the reflected pulse from interfering with the operation of gate 31.

The passive network modulator 3e of Fig. 4 is illustrated as including a photoelectric cell 35 and an impedance matching transformer 36 disposed between the output of delay device 2e and the photocell 35. The matching transformer 36 terminates delay device 2e in its characteristic impedance when zero modulation is impressed upon photocell 35. The light energy from modulating source 4e causes the conduction resistance of photocell to vary in accordance with this modulation and thus unbalances the impedance match as established by transformer 36 to provide pulse reflections whose amplitude and polarity is a function of the amplitude and polarity of the energy of the modulating source.

Figure 5:
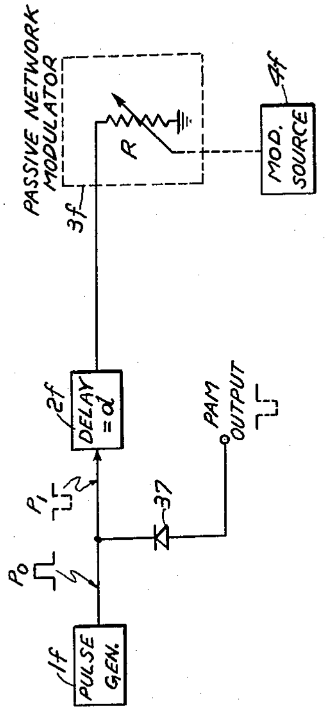

The embodiment illustrated in Fig. 5 discloses a PAM modulating system which produces only negative polarity PAM pulses. The output of pulse generator 1f is coupled by delay device 2f to the passive network modulator 3f which includes a resistance whose value is varied by modulation source 4f of the mechanical type between the value of zero and the characteristic impedance of delay device 2f. The variation of the terminating resistance between zero and the characteristic impedance of the delay device will provide an average resistance value equal to the square root of the characteristic impedance and thus will always produce a negative polarity reflecting pulse. The unidirectional device 37 is provided in the output connection of this embodiment to function as a buffer to remove from the output terminal 38 any influence of the energizing pulse from generator 1f. Thus, the reflected pulse only constitutes the resultant pulse signal.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse modulation system comprising a pulse generator, variable resistance means, a transmission means coupling the output of said pulse generator to said variable resistance means, said variable resistance means terminating said transmission means to produce a reflected pulse signal, a source of signal energy, means coupled to said signal source and responsive to the signal energy of said signal source to modulate the resistive characteristic of said variable resistance means in accordance with the magnitude of said signal energy, said reflected pulse signal being amplitude modulated in accordance with the modulated resistive characteristic of said variable resistance means, and means to couple from said transmission means the resultant amplitude modulated pulse signal.

2. A system according to claim 1, wherein the time delay of said transmission means is selected with respect to the repetition rate of the pulse output of said pulse generator to space said resultant amplitude modulated pulse signal from the pulses of the pulse output of said pulse generator.

3. A pulse modulation system comprising a pulse generator, variable resistance means, a delay means coupling the output of said pulse generator to said variable resistance means, said variable resistance means terminating said delay means to produce a reflected pulse signal, a source of signal energy, means coupled to said signal source and responsive to the signal energy of said signal source to modulate the resistive characteristic of said variable resistance means in accordance with the magnitude of said signal energy, said reflected pulse signal being amplitude modulated in accordance with the modulated resistive characteristic of said variable resistance means, and means to couple from said transmission means the resultant amplitude modulated pulse signal.

4. A pulse modulation system comprising a pulse generator, variable resistance means, a delay means having a given characteristic impedance coupling the output of said pulse generator to said variable resistance means, said variable resistance means terminating said delay means to produce a reflected pulse signal, a source of signal energy, means coupled to said signal source and responsive to the signal energy of said signal source to modulate the resistive characteristic of said variable resistance means above and below said given characteristic impedance in accordance with the magnitude of said signal energy, the amplitude and polarity of said reflected pulse signal being determined by the modulated resistive characteristic of said variable resistance means, and means to couple from said delay means the resultant amplitude modulated pulse signal.

5. A system according to claim 4, wherein said variable resistance means includes a unidirectional device and a bias voltage arrangement coupled to said unidirectional device to adjust the conduction resistance thereof to be equal to the characteristic impedance of said delay means, said source of signal energy modulating the conduction resistance of said unidirectional device to provide the modulated resistance characteristic therefor.

6. A system according to claim 4, wherein said variable resistance means includes an impedance matching device to terminate said delay means in its characteristic impedance and a photocell coupled to said impedance matching device to modulate the terminating resistance thereof by conduction variation of said photocell in response to the energy of said source of signal energy.

7. A system according to claim 4, wherein said variable resistance means includes a variable resistor whose resistance value is modulated in accordance with the energy of said source of signal energy.

8. A pulse modulation system comprising a source of pulses, a source of signal energy, variable resistance means, means coupled to said signal source and responsive to the signal energy of said signal source to modulate the resistive characteristic of said variable resistance means in accordance with the magnitude of said signal energy, a delay line having one end thereof coupled to said source of pulses and the other end thereof coupled to said variable resistance means, said variable resistance means terminating the other end of said delay line to produce a reflected pulse signal whose amplitude and polarity is a function of the modulated resistive characteristic of said variable resistance means, utilization means and conductive means connected to said one end of said delay line to couple the pulses of said source of pulses as marker signals and said reflected pulse signals as intelligence signals to said utilization means.

9. A pulse modulation system comprising a source of pulses, a source of signal energy, variable resistance means, means coupled to said signal source and responsive to the signal energy of said signal source to modulate the resistive characteristic of said variable resistance means in accordance with the magnitude of said signal energy, a delay line having one end thereof coupled to said source of pulses and the other end thereof coupled to said variable resistance means, said variable resistance means terminating the other end of said delay line to produce a reflected pulse signal whose amplitude and polarity is a function of the modulated resistive characteristic of said variable resistance means, utilization means, a coincident gate circuit, conductive means connected to said one end of said delay line to couple said reflected pulse signals to said gate circuit, a second delay line having a time delay equal to twice the time delay of said first delay line connected to the output of said source of pulses to couple the pulses thereof to said gate circuit for coincident operation thereof to pass said reflected pulse signals, and means to couple the output of said gate circuit to said utilization means.

10. A pulse modulation system comprising a source of pulses, a source of signal energy, variable resistance means, means coupled to said signal source and responsive to the signal energy of said signal source to modulate the resistive characteristic of said variable resistance means in accordance with the magnitude of said signal energy, a delay line having one end thereof coupled to said source of pulses and the other end thereof coupled to said variable resistance means, said variable resistance means terminating the other end of said delay line to produce a reflective pulse signal whose amplitude and polarity is a function of the modulated resistive characteristic of said variable resistance means, utilization means, and a unidirectional device connected to said one end of said delay line to couple said reflected pulse signals to said utilization means and block the pulses of said source of pulses.

11. A pulse modulation system comprising a source of pulses, a source of signal energy, variable resistance means, means coupled to said signal source and responsive to the signal energy of said signal source to modulate the resistive characteristic of said variable resistance means in accordance with the magnitude of said signal energy, a delay line, means coupling the output of said source of pulses to one end of said delay line, means coupling the other end of said delay line to said variable resistance means, said variable resistance means terminating the other end of said delay line to produce a reflected pulse signal whose amplitude and polarity is a function of the modulated resistive characteristic of said variable resistance means, utilization means, a normally open gate circuit, conductive means to couple the output of said source of pulses to said gate circuit for closing the circuit thereof, conductive means connected to said one end of said delay line to couple said reflected pulse signal to said gate circuit and means to couple said reflected pulse signal from said gate circuit to said utilization means.

12. A pulse modulation system comprising a source of pulses, a plurality of sources of signal energy, a variable resistance means coupled to each of said sources of signal energy responsive to said signal energy to modulate the resistive characteristic thereof in accordance with the magnitude of said signal energy, a plurality of delay devices each having a progressively greater time delay than the previous delay device, means coupling the output of said source of pulses to one end of each of said delay devices, means coupling the other end of each of said delay devices to said variable resistance means, said variable resistance means terminating each of said delay devices to produce thereon reflected pulse signals whose amplitude and polarity is a function of the modulated resistive characteristic of the associated one of said variable resistance means, utilization means, a means coupled to each of said one end of said delay devices to mix the individual reflected pulse signals with the pulses of said source of pulses to provide a time interleaved pulse train having a marker signal and a plurality of intelligence signals, and means to couple said pulse train to said utilization means.

13. A pulse modulation system comprising a source of pulses at a local point, a source of signal energy and variable resistance means, means coupled to said signal source and responsive to the signal energy of said signal source to modulate the resistive characteristic of said variable resistance means in accordance with the magnitude of said signal energy at a point remote from said local point, a transmission means coupled between said source of pulses and said variable resistance means, said variable resistance means terminating said transmission means to produce a reflected pulse signal whose amplitude and polarity is a function of the modulated resistive characteristic of said variable resistance means, demodulation and indicating means at said local point, and means to couple the resultant pulse signal from said transmission means to said demodulation and indicating means.

14. A pulse modulation system comprising a source of pulses at a local point, a source of signal energy and variable resistance means, means coupled to said signal source and responsive to the signal energy of said signal source to modulate the resistive characteristic of said variable resistance means in accordance with the magnitude of said signal energy at a point remote from said local point, a transmission means coupled between said source of pulses and said variable resistance means, said transmission means including the transmission medium between said local point and said remote point and a physical delay line, said variable resistance means terminating said transmission means to produce a reflected pulse signal whose amplitude and polarity is a function of the modulated resistive characteristic of said variable resistance means, demodulation and indicating means at said local point, and means to couple the resultant pulse signal from said transmission means to said demodulation and indicating means.

References Cited in the file of this patent

UNITED STATES PATENTS

| | | |
|---|---|---|
| 2,217,957 | Lewis | Oct. 15, 1940 |
| 2,458,574 | Dow | Jan. 11, 1949 |
| 2,511,409 | Mayberry | June 13, 1950 |
| 2,597,607 | Alford et al. | May 20, 1952 |
| 2,729,793 | Anderson | Jan. 3, 1956 |